United States Patent [19]

Gomer

[11] 4,153,346

[45] May 8, 1979

[54] COMBINED SUNGLASSES AND EAR PENDANTS

[76] Inventor: Bernard Gomer, 8000 West Dr., Miami Beach, Fla. 33141

[21] Appl. No.: 817,917

[22] Filed: Jul. 22, 1977

[51] Int. Cl.² .......................... G02C 11/02; G02C 3/00
[52] U.S. Cl. ........................................ 351/52; 351/83; 351/156
[58] Field of Search ................ 351/156, 121, 52, 51, 351/83, 103; 63/29 R, 23

[56] References Cited

U.S. PATENT DOCUMENTS

| 747,910 | 12/1903 | Gage | 63/23 X |
| 2,220,038 | 10/1940 | Kreisler et al. | 63/23 X |
| 2,555,578 | 6/1951 | Davis | 351/52 |

FOREIGN PATENT DOCUMENTS

| 733848 | 7/1955 | United Kingdom | 351/52 |
| 1158457 | 7/1969 | United Kingdom | 351/156 |

*Primary Examiner*—Paul A. Sacher
*Attorney, Agent, or Firm*—Erwin M. Barnett

[57] ABSTRACT

A pair of decorative sunglasses has temples of chain or cord, each sized to extend, when worn, over and behind the ears and down to the ear lobe and to connect to a pendant suspended therefrom. As a modification, the sunglass frames and pendants are formed of transparent material with separable mating halves which snap apart and together to permit changing a decorative sheet which fits between the halves.

1 Claim, 6 Drawing Figures

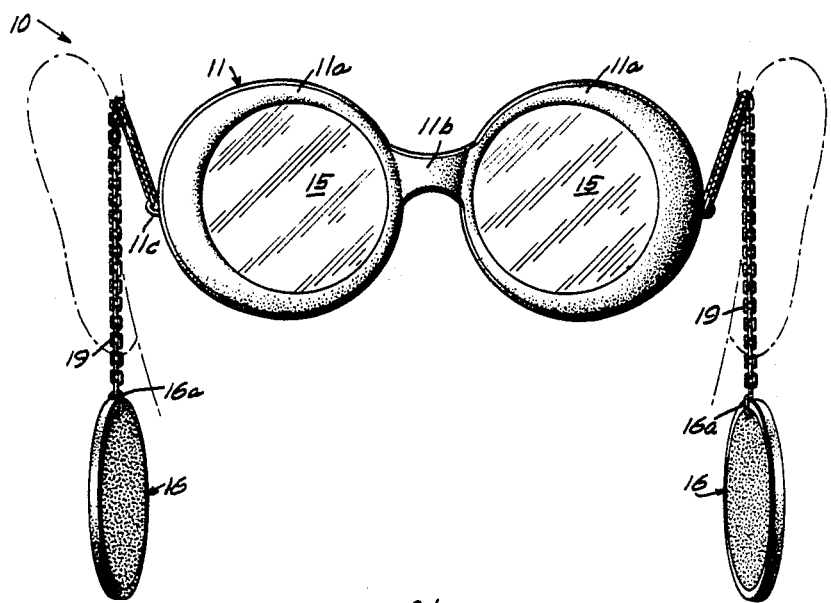
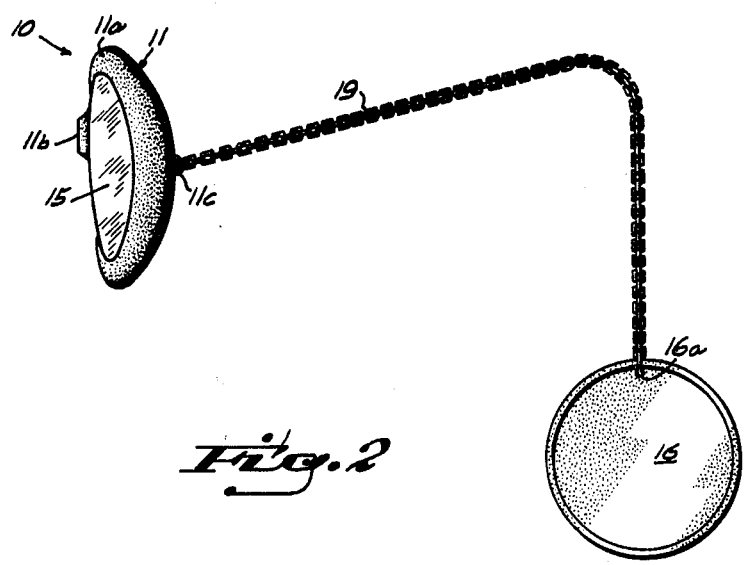

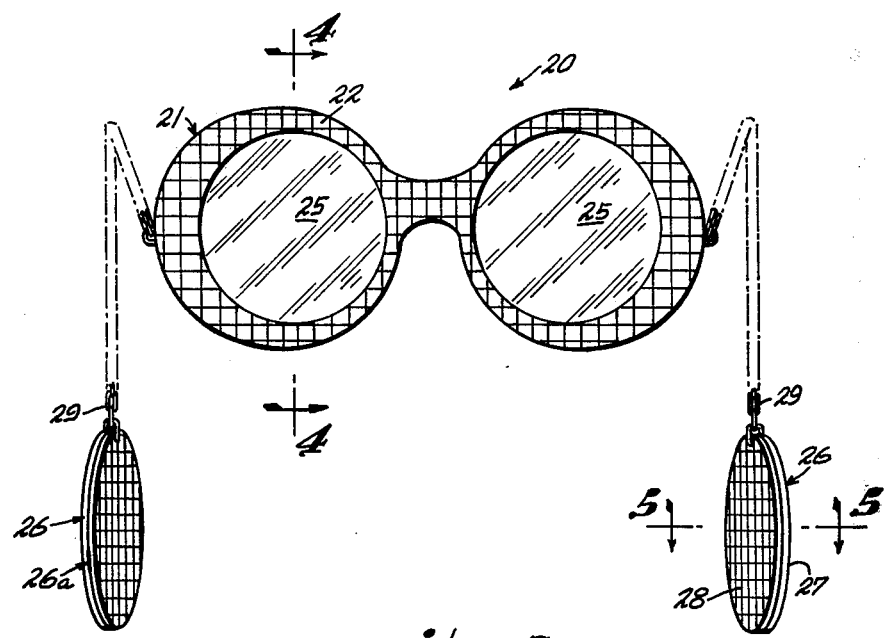
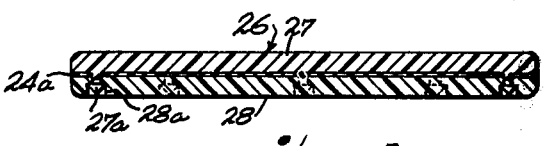
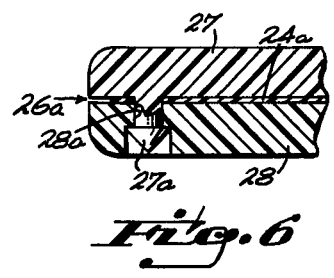

COMBINED SUNGLASSES AND EAR PENDANTS

BACKGROUND OF THE INVENTION

1. Field of the Invention

The invention relates to articles of personal adornment and more particularly is directed to decorative sunglasses having design related earrings or pendants suspended from the ends of the temple members extending behind the ears.

2. Description of the Prior Art

Large and ornate earrings and pendants are popular as relatively inexpensive costume jewelry as accessories for summer wear at beach resorts, on cruises, at sporting events and the like. The wearing of large ear pendants, while attractive and fashionable, usually requires pierced ear lobes in order to avoid the discomfort and annoyances of the alternate form of clip attachment. Also, it is often desirable to remove the earrings while swimming and diving which presents the risk of loss or misplacement.

SUMMARY OF THE INVENTION

Among the objects of the invention is to facilitate the wearing of relatively large ear pendants in daytime sportswear by combining the pendants with sunglasses in a manner to eliminate the several disadvantages of large earrings as hereinbefore set forth and also to provide a pair of sunglasses and ear pendants as an adornment item which shall be inexpensive to manufacture and be suited to coordinating with the design and style appeal of the total outfit of the wearer.

The combined sunglasses and ear pendants feature temple members as flexible cord-like structures which retain the eyeglass frame in position on the wearer's face by extending over and behind the ears and terminating in ear pendants which are suspended just behind and below the ear lobes serving both as an earring ornament and to retain the limp temple members taut.

A modified construction contemplates coordinating the design of the frame with that of the pendants and provides for an interchangeability of design by molding the frame and pendants as separable mating halves of a substantially transparent plastic material with selectively changeable design sheets sandwiched therebetween. Snap-in and snap-out means are integrally formed with the mating halves to facilitate separation and reassembly.

BRIEF DESCRIPTION OF THE DRAWINGS

FIG. 1 is a front perspective view of the combined sunglasses and ear pendants embodying the invention, the chains and pendants being disposed in the intended position on a wearer's head, the wearer's ears being outlined in broken lines.

FIG. 2 is a side elevational view of the sunglasses and ear pendants as shown and positioned in FIG. 1.

FIG. 3 is a front perspective view similar to FIG. 1 but showing a modified form of construction.

FIGS. 4 and 5 are enlarged sectional views taken on lines 4—4 and 5—5, respectively, in FIG. 3, and FIG. 6 is a fragmentary sectional view similar to FIG. 5, but enlarged to show a form of snap-in element for separably connecting the mating halves of the pendant.

DESCRIPTION OF THE PREFERRED EMBODIMENTS

Referring in detail to the drawings, 10 generally denotes the combined sunglasses and ear pendants embodying the invention seen in FIGS. 1 and 2 to comprise an eyeglass frame 11 having a pair of chains 19 serving as temple members, each chain 19 being adapted to extend over and behind the wearer's ear and to suspend pendants 16, which terminate chains 19, just below the ear lobes.

Frame 11 may be of conventional construction, for example made of metal or as shown, molded of a suitable plastic material, such as polystyrene, having a nose bridge 11b which interconnects a pair of lens frames 11a fitted with lenses 15. Lens frames 11a and lenses 15 may be of the large (bug-eye) type currently in vogue and each lens frame 11a may have an integrally formed nose pad for cooperating with nose bridge 11b in supporting frame 11 on the wearer's face in the well understood manner. Opposite sides of each lens frame 11a suitably mounts, as by embedment therein, a closed loop 11c to which one end of each chain 19 attaches. The opposite end of each chain 19 connects to pendant 16 by a terminal link 16a which may pass through an opening in pendant 16 adjacent the edge thereof or may be attached by any other suitable means.

The invention contemplates the use of any flexible and preferably limp cord-like structure as temple members 19, as for example, the relatively fine-link chain illustrated in the drawings, a beaded chain, a multi-strand straight or braided cord, or a string of small size beads or simulated pearls and the like. Likewise, pendants 16 may be chosen from a wide variety of articles and materials, such as, the illustrated disks of molded plastic which in appearance match frame 11, molded plastic of various shapes and configurations which may be embossed with designs or figures, metal medallions or rings, or semi-precious stone carved in any design, figure and the like.

The manner in which combined sunglasses and ear pendants 10 are worn and function will now be apparent. Frame 11 is placed in position on the face and temple members 19 are gently pulled back over the ears permitting pendants 16 to hang freely behind and below the ear lobes retaining the limp chain or other flexible cord in a taut condition holding frame 11 in place.

Combined sunglasses and ear pendants 20, shown in FIGS. 3 to 6, inclusive, as a modification embodying the invention, comprise an eyeglass frame 21 supporting lenses 25 and formed of transparent front and rear mating halves 22 and 23 with a sheet 24, bearing a distinctive color or decorative design, sandwiched therebetween. Likewise, pendants 26 which terminate the temple members 29 are also formed with a pair of mating halves 27, 28 having a design sheet 26a therebetween, which preferably will match sheet 24, although a contrasting or coordinate color or design may be used.

A feature of this modification is the separability of mating halves 22 and 27 from mating halves 23 and 28, enabling decorative sheets 24 and 24a, respectively, to be selectively changed for other sheets of different colors and design patterns so that combined sunglasses and ear pendants 20 may be worn as an accessory adornment with a variety of different outfits. To this end, any suitable snap-in/snap-out means may be provided for separably connecting mating halves 22, 23 and 27, 28, such as, integrally formed elements 22a and 27a spaced apart adjacent the periphery of and projecting from mating halves 22 and 27, respectively, to snap into registering female elements 23a and 28a formed as openings in mating halves 23 and 28, respectively. A plurality of sets of sheets may be provided with each combined sunglasses and ear pendants 20, each set having a different color or design and comprising a sheet 24 and two sheets 24a suitably cut to size and shape and indexed with openings for male elements 22a and 27a. To facilitate the separation of mating halves 22 and 27 from mating halves 23 and 28, respectively, a suitable edge groove may be provided between the abutting surfaces of mating halves 22, 23 and 27, 28 to accommodate a knife blade or other instrument for prying apart the respective mating halves. Such edge groove is indicated at 26a in FIGS. 3 and 6 between mating halves 27 and 28 of pendant 26, it being understood that frame 22 will be provided with similar edge grooves.

Where required by the thickness of decorative sheets 24 and 24a, the interior surfaces of one or both mating halves 22, 23 and 27, 28 may be depressed from a peripheral bead to receive sheets 24 and 24a therein thereby providing neat appearing edges for frame 22 and pendants 26.

The combined sunglasses and ear pendants and modifications herein disclosed are seen to achieve the several objects of the invention and to be well adapted to meet conditions of practical use. As various possible embodiments might be made of the invention, and as various changes might be made in the disclosed structure, it is to be understood that all matters herein set forth or shown in the accompanying drawings are to be interpreted as illustrative and not in a limiting sense.

What is claimed is:

1. A combined sunglasses and ear pendants adornment comprising an eyeglass frame mounting lenses therein, a pair of flexible cord-like temple members attached to opposite sides of the frame, a decorative pendant terminating each temple member, said temple members being adapted to extend over and behind the ears of a wearer and to suspend the decorative pendants behind and below the ear lobes, said eyeglass frame being formed as a pair of front and rear mating halves, a decorative sheet sandwiched therebetween, said front mating half being transparent whereby the design of the decorative sheet is visible therethrough and provides the design for the frame, each of said pendants being formed as transparent mating halves, a decorative sheet sandwiched between said pendant mating halves, said mating halves of the eyeglass frame and pendants being integrally formed with snap-in/snap-out means to permit separation of said mating halves for changing the decorative sheets therebetween and for reassembly of the frame and pendants with other decorative sheets, said mating halves of said eyeglass frame and pendants having edge portions formed with grooves between said mating halves to accommodate a prying instrument to effect said snap-in/snap-out separation.

* * * * *